US011248639B2

(12) United States Patent
Harrop et al.

(10) Patent No.: US 11,248,639 B2
(45) Date of Patent: Feb. 15, 2022

(54) CONNECTION APPARATUS

(71) Applicant: ADVANCED INSULATION LIMITED, Gloucester (GB)

(72) Inventors: Martin Harrop, Gloucester (GB); Greg Van Hinsbergh, Gloucester (GB)

(73) Assignee: ADVANCED INNERGY LTD, Gloucester (GB)

( * ) Notice: Subject to any disclaimer, the term of this patent is extended or adjusted under 35 U.S.C. 154(b) by 273 days.

(21) Appl. No.: 16/487,781

(22) PCT Filed: Feb. 14, 2018

(86) PCT No.: PCT/GB2018/050399
§ 371 (c)(1),
(2) Date: Aug. 21, 2019

(87) PCT Pub. No.: WO2018/154278
PCT Pub. Date: Aug. 30, 2018

(65) Prior Publication Data
US 2020/0025230 A1    Jan. 23, 2020

(30) Foreign Application Priority Data

Feb. 22, 2017    (GB) ...................................... 1702830

(51) Int. Cl.
*F16B 9/00*    (2006.01)
*H02G 15/013*  (2006.01)
(Continued)

(52) U.S. Cl.
CPC .............. *F16B 9/05* (2018.08); *H02G 15/013* (2013.01); *H02G 15/06* (2013.01); *E21B 33/0385* (2013.01); *H02G 9/02* (2013.01)

(58) Field of Classification Search
CPC ...... E21B 17/023; E21B 33/0385; F16B 9/05; F16L 3/00; H02G 15/013; H02G 15/06; H02G 9/02
See application file for complete search history.

(56) References Cited

U.S. PATENT DOCUMENTS 3,197,378 A    7/1965 Fortescue
3,424,242 A    1/1969 Triplett
(Continued)

FOREIGN PATENT DOCUMENTS

GB    2297593 A    8/1996
GB    2325968 A    12/1998
(Continued)

OTHER PUBLICATIONS

International Search Report and Written Opinion, corresponding International Application No. PCT/GB2018/050399, dated Oct. 29, 2018.
(Continued)

*Primary Examiner* — Timothy J Thompson
*Assistant Examiner* — Rhadames Alonzo Miller
(74) *Attorney, Agent, or Firm* — Marshall, Gerstein & Borun LLP

(57) ABSTRACT

A connection apparatus 10 for mounting a cable to a structure such as a wind turbine or oil rig. The apparatus 10 including a receiving member 14 having a hollow body with a diverging mouth, a latch member 22 movably mounted on the outside of the receiving member 14 with a latch part 24 extending into the receiving member 14. A mounting member 16 is provided which mounts the cable extending therethrough. The mounting member 16 is selectively locatable in the receiving member 14 with the latch part 24 engaging with a retaining formation in the form of a groove 56 to retain the mounting member 16 in the receiving member 14 and hence retain the cable mounted to the structure.

11 Claims, 6 Drawing Sheets

(51) Int. Cl.
*H02G 15/06* (2006.01)
*E21B 33/038* (2006.01)
*H02G 9/02* (2006.01)

(56) References Cited

U.S. PATENT DOCUMENTS

| | | | | |
|---|---|---|---|---|
| 3,434,296 | A * | 3/1969 | Geer | E21B 43/0107 405/168.1 |
| 3,982,776 | A * | 9/1976 | Payne | F16L 37/002 285/24 |
| 4,523,877 | A * | 6/1985 | Finn | F16L 1/19 405/195.1 |
| 5,564,716 | A * | 10/1996 | Onoue | H01R 13/5205 277/607 |
| 6,003,873 | A * | 12/1999 | Solberg | F16L 55/128 277/323 |
| 6,196,757 | B1 * | 3/2001 | Bakke | E21B 41/10 403/328 |
| 6,386,798 | B2 * | 5/2002 | Finn | E21B 17/015 166/359 |
| 2008/0087435 | A1 * | 4/2008 | Reddy | F16L 37/144 166/343 |
| 2011/0094748 | A1 * | 4/2011 | Reddy | E21B 43/0107 166/343 |
| 2011/0162747 | A1 * | 7/2011 | Routeau | E21B 19/004 138/106 |
| 2011/0226527 | A1 * | 9/2011 | Ritchie-Bland | F16L 57/02 174/669 |
| 2018/0034254 | A1 * | 2/2018 | Thomson | H02G 3/22 |
| 2018/0187657 | A1 * | 7/2018 | Nielsen | F03D 80/85 |
| 2019/0136486 | A1 * | 5/2019 | Berque | B63B 35/04 |
| 2019/0214801 | A1 * | 7/2019 | Smith | H02G 1/081 |

FOREIGN PATENT DOCUMENTS

| | | |
|---|---|---|
| WO | WO-2008/062212 A1 | 5/2008 |
| WO | WO-2016/133748 A1 | 8/2016 |

OTHER PUBLICATIONS

Combined Search and Examination Report, issued in the UK Intellectual Property Office for GB Patent Application No. GB1802425.7, dated Aug. 14, 2018.

* cited by examiner

CONNECTION APPARATUS

CROSS REFERENCE TO RELATED APPLICATIONS

The present application is the U.S. national phase of International Application No. PCT/GB2018/050399 filed Feb. 14, 2018, which claims priority from Application No. 1702830.9 filed Feb. 22, 2017 in the United Kingdom. The entire contents of these applications are incorporated herein by reference in their entireties.

FIELD OF THE INVENTION

This invention concerns apparatus for connecting an elongate flexible member to an item.

BACKGROUND OF THE INVENTION

In a number of applications it is necessary for a flexible elongate member such as a cable to be connected to an item. It is desirable for the elongate member to be readily connectable to the item, but to be protected from damage in use. This is particularly the case where the elongate member is likely to be caused to move relative to the item, such as for instance when located subsea. In such a location the elongate member may be subject to tidal and/or wave movement and other movement of the water, which potentially could cause the elongate member to be damaged.

Such applications can include cables extending to marine wind turbines, oil rigs or such structures. Such cables are often mounted to tubes, often referred to as "J Tubes" which are provided on the exterior of support structures such as legs. It is required to provide a readily usable connector for the mounting of for instance cables to such tubes. A number of prior arrangements have been proposed. These have often not provided sufficient protection to the elongate member. They have also often been difficult to connect, and if necessary to subsequently disconnect, in such environments.

SUMMARY OF THE INVENTION

According to a first aspect of the invention there is provided connection apparatus for mounting a cable to a structure, the apparatus including a receiving member on the structure, the receiving member comprising a cylindrical hollow body with a diverging mouth, a latch member movably mounted on the outside of the body with a latch part selectively extending into the body, and a mounting member through which the cable can extend, the mounting member being locatable in the body with the latch part selectively engageable with a retaining formation on the mounting member to retain the mounting member in the body and hence the cable mounted to the structure.

The apparatus may be arranged such that the latch part automatically engages with the mounting member as the mounting member is introduced into the body.

The retaining formation may comprise a circumferential formation, which may comprise a groove.

The latch member may be selectively movable between an engagement position in which the latch part can engage with the mounting member, and a disengagement position in which the latch part is clear of the mounting member such that the mounting member can be withdrawn from the hollow body.

The latch member may be pivotally mounted on the outside of the hollow body and may be urged to an engagement position. A pivot pin may be provided on the latch member engageable with a pivot formation on the outside of the hollow member. The latch part may be provided on the latch member on one side of the pivot formation, with a resilient member on the other side of the pivot formation urging the latch part into the mounting member.

The pivot pin may be selectively removable from the pivot formation to permit release of the latch member from the hollow body. The pivot pin may include a formation to enable the pin to break to permit removal from the pivot formation. Alternatively or in addition, a removable fastening member may be provided on the pivot pin to retain the pivot pin on the pivot formation.

A link formation may be provided on the latch member to permit the latch member to be moved to a disengagement position by remote operation. The link formation may be provided on said one side of the pivot formation, and the link formation may be provided on the opposite side of the latch member to the pivot formation. The link formation may comprise an opening, and line means may be provided extending from the link formation.

The latch part may have an outwardly facing inclined edge, with which inclined edge the mounting member is engageable when entering the hollow body, such that the latch part is urged outwardly until the latch part engages with the retaining formation.

The latch part may have an at least generally radially aligned edge facing inwardly to retain the mounting member in the hollow body once the latch part engages with the retaining formation.

A stop formation may be provided in the hollow body against which stop formation the distal end of the mounting member is engageable when fully in the hollow body. A seal member may be provided on the hollow body against which seal member the mounting member engages when fully in the mounting member. The seal member may include a profiled resilient member.

The mounting member may have a converging distal end. The part of the hollow member which receives the distal end of the mounting member may be correspondingly profiled.

The mounting member may include a first distal part and a second proximal part. The distal part may be more rigid than the proximal part.

Formations may be provided within the hollow body to urge the mounting member into a required alignment as it enters into the hollow body.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
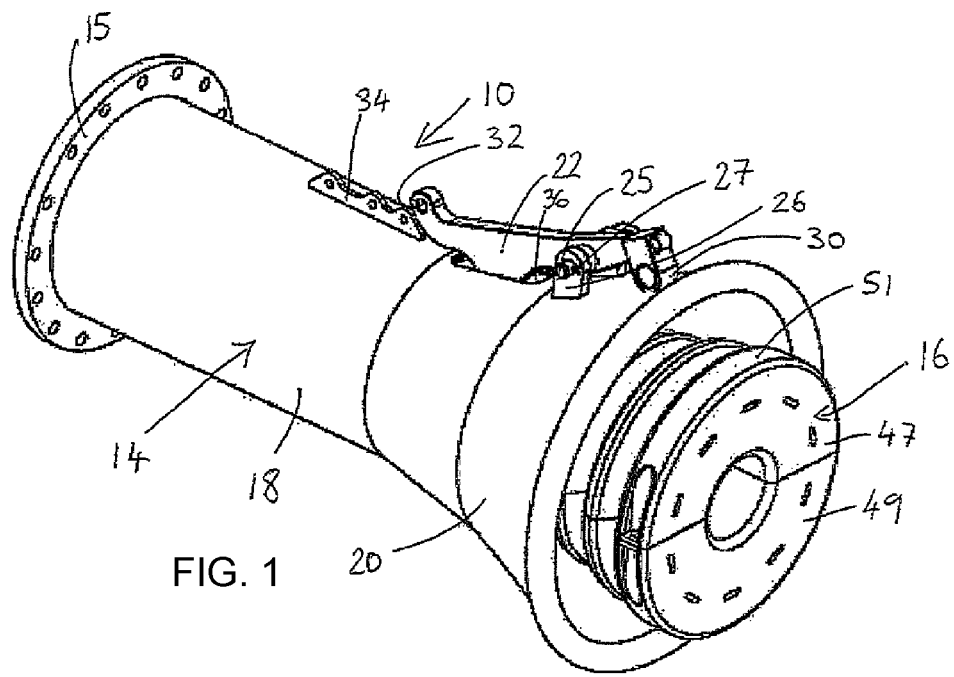
FIG. 1 is a diagrammatic perspective view in use of part of connection apparatus according to the invention.
Figure 2:
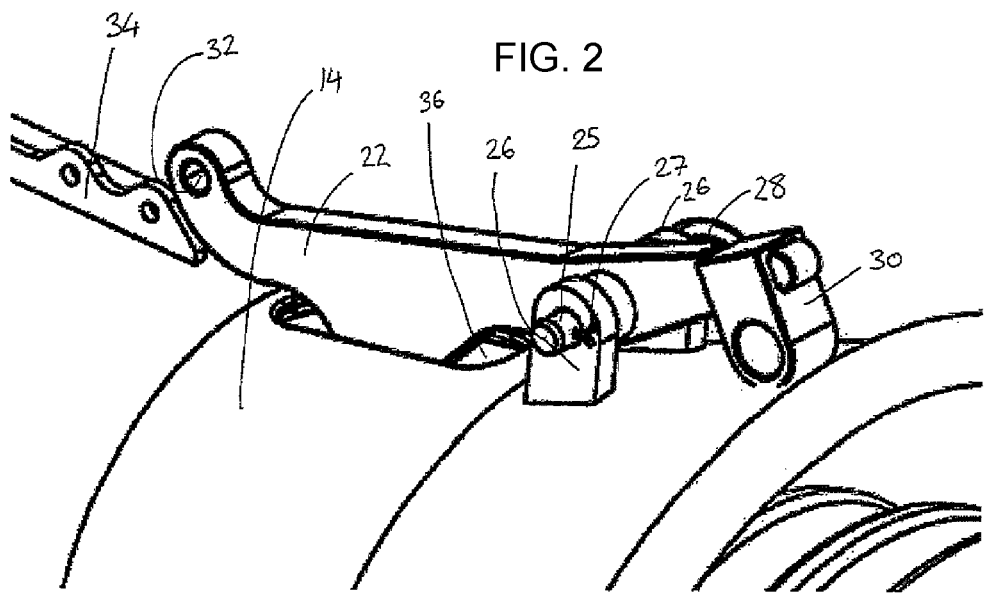
FIG. 2 is a perspective view of a portion of the apparatus of FIG. 1.
Figure 3:
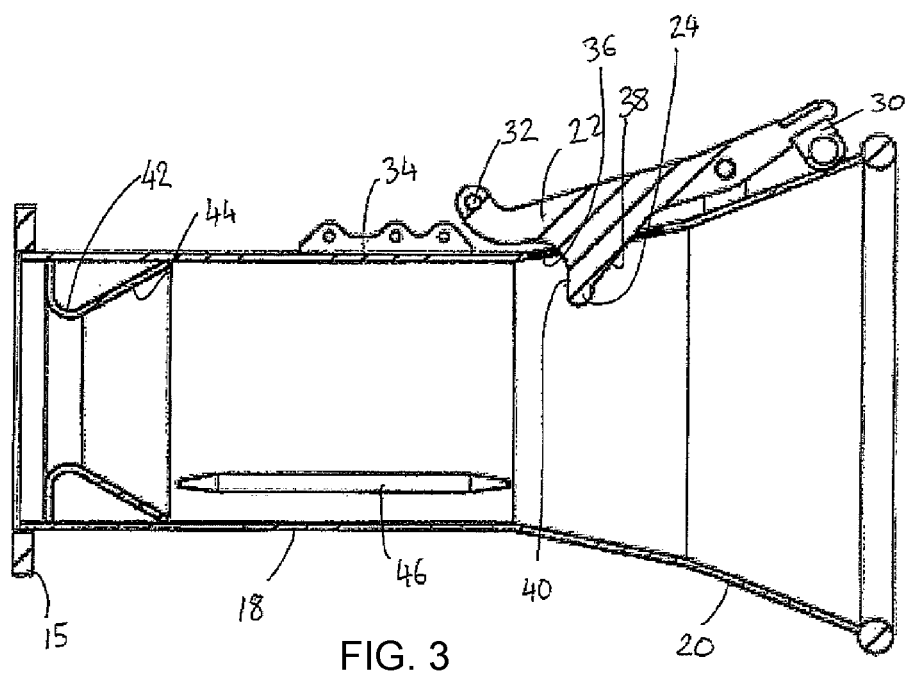
FIG. 3 is a diagrammatic sectional view of a first part of the apparatus of FIG. 1.
Figure 4:
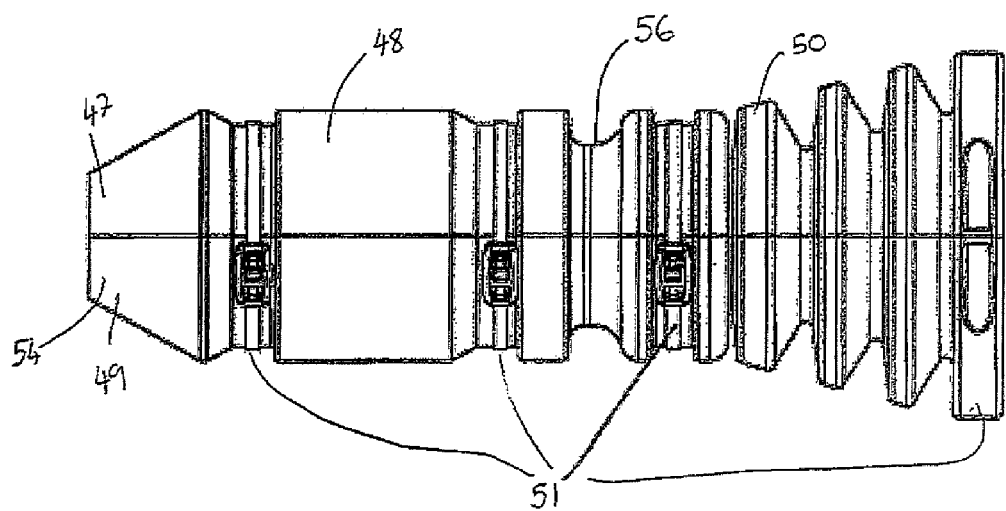
FIG. 4 is a diagrammatic side view of a second part of the apparatus of FIG. 1.
Figure 5:
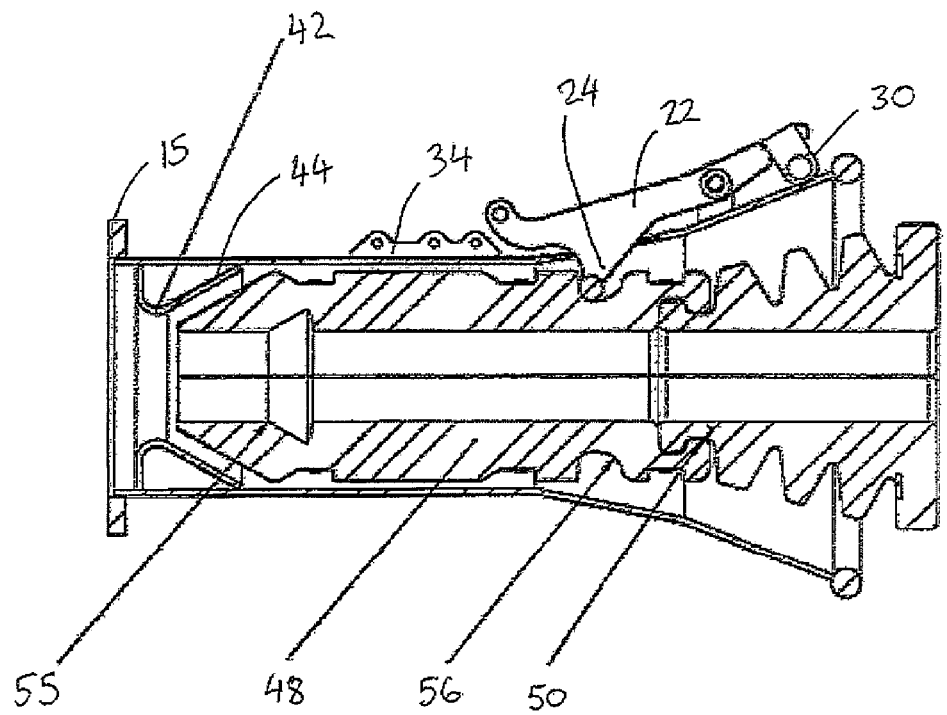
FIG. 5 is a diagrammatic cross sectional view of the first and second parts of the apparatus of FIG. 1 in engagement.

The drawings show a connection apparatus 10 for connecting a cable as shown diagrammatically by the center line 12 in FIGS. 6-12, to an item such as a J tube which could be located on a structure such as a wind turbine or oil rig. The connection apparatus 10 comprises a receiving member 14 which could be mounted for instance to the end of a J member. A flange 15 is provided on one distal end of the receiving member 14 which permits mounting to a corresponding flange on an end of the J tube. The apparatus 10 also comprises a mounting member 16 which mounts the cable so as to extend therethrough.

The receiving member 14 comprises a cylindrical tube 18 with a diverging mouth 20 at the proximal other end to the flange 15. A latch member 22 is provided in the form of a profiled arm with a latch part 24 extending therefrom. The latch member 22 is provided on the outside of the receiving member 14, and is pivotally mounted thereto by a pivot pin 25 extending between two spaced projections 26 on the outside of the receiving member 14, close to the beginning of the mouth 20. The pivot pin 25 may have a frangible formation to permit shearing thereof, and/or include a fastener means such as a split pin 27 at one end thereof. A head 28 with a through hole is provided at the opposite end of the pin 25 to any fastener means, to enable line means to be connected to the pin 25 if necessary to perhaps cause removal or shearing thereof if necessary.

A polymer spring 30 is provided on the latch member 22 at the end nearest the receiving member mouth 20 opening, and is engageable with the outside of the receiving member 14 to urge that end of the latch member 22 away from the receiving member 14. The opposite end of the latch member 22 is gently cranked and includes a through hole 32 to permit remote operation thereof if required.

A latch part 24 extends from part way along the latch member 22 and extends through an opening 36 into the receiving member 14. The latch part 24 is selectively movable into and out of the receiving member 14 by pivotal movement of the latch member 22. The latch part 24 has an inclined face 38 facing towards the receiving member mouth 20. The opposite face of the latch part 34 has a generally radial face 40.

A lifting point 34, in the form of an outwardly extending web with three through holes is provided on the outside of the receiving member 14, adjacent the distal end, the left as shown in the drawings of the latch member 22.

A sealing/stop ring 42 is provided within the receiving member 14 towards the distal end thereof, with a converging opening 44. Two elongate guide members 46 are provided on the inside of the receiving member 14 extending from adjacent the mouth 20 thereof to adjacent the sealing/stop ring 42.

The mounting member 16 comprises a profiled distal part 48 and a proximal part 50 interconnected extending therefrom.

Both the distal and proximal parts 48, 50 are formed of two semicircular parts 47, 49, which parts 47, 49 are held together by respective straps 51.

The proximal part 50 is made of a more flexible material than the distal part 48, and can be connected to a bend limiter extending around the cable. The bend limiter 52 restricts the amount of bending of the cable, and hence protects the cable 12 from damage thereto.

One or both parts 48, 50 of the mounting member 16 may be made for instance of polyurethane, with different grades providing different flexibility.

The distal part 48 of the mounting member 16 has a converging end 54 from which a cable can sealingly extend. A retaining formation 56 in the form of a circumferential groove is provided around the mounting member distal part 48, towards the proximal end thereof.

Figure 6:
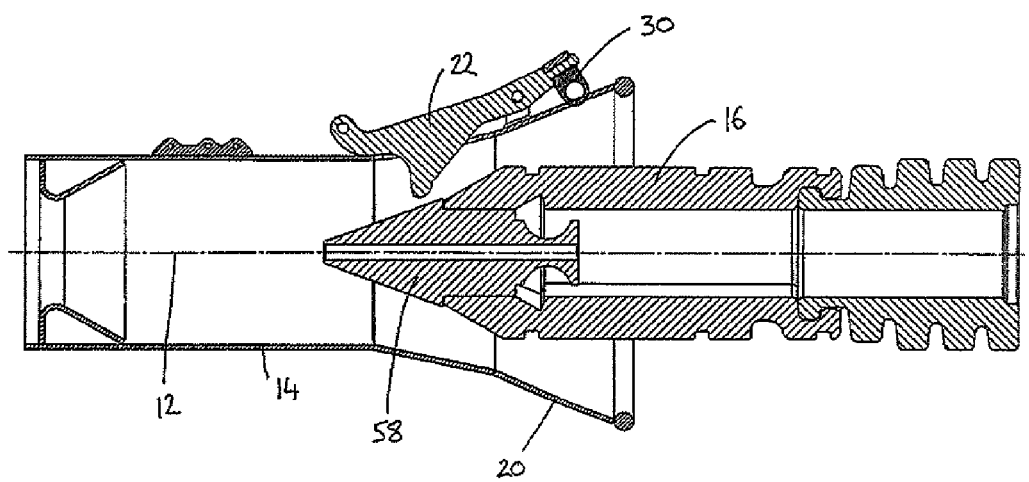
FIGS. 6 to 12 are diagrammatic cross sectional sequential views of the first and second parts of an apparatus similar to that shown in FIG. 1 being connected together.
Figure 7:
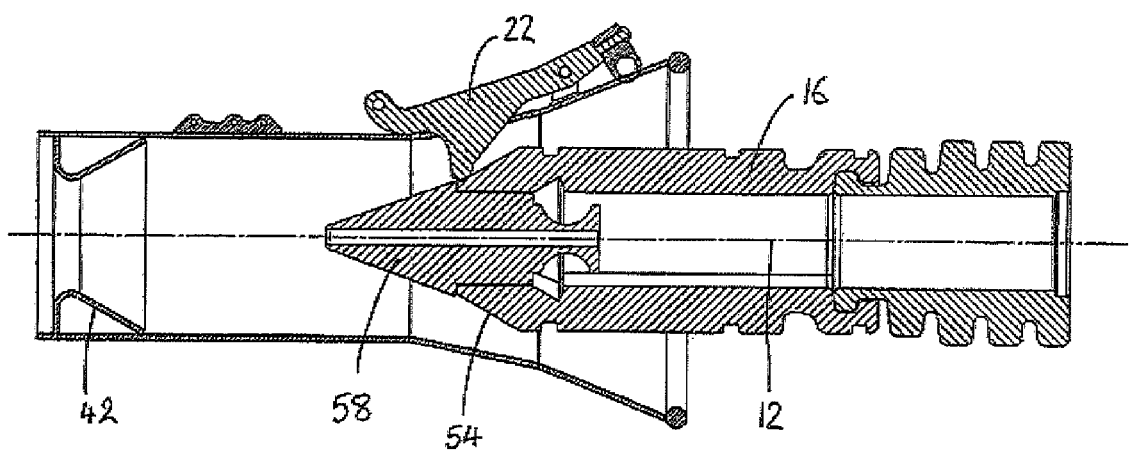
Figure 8:
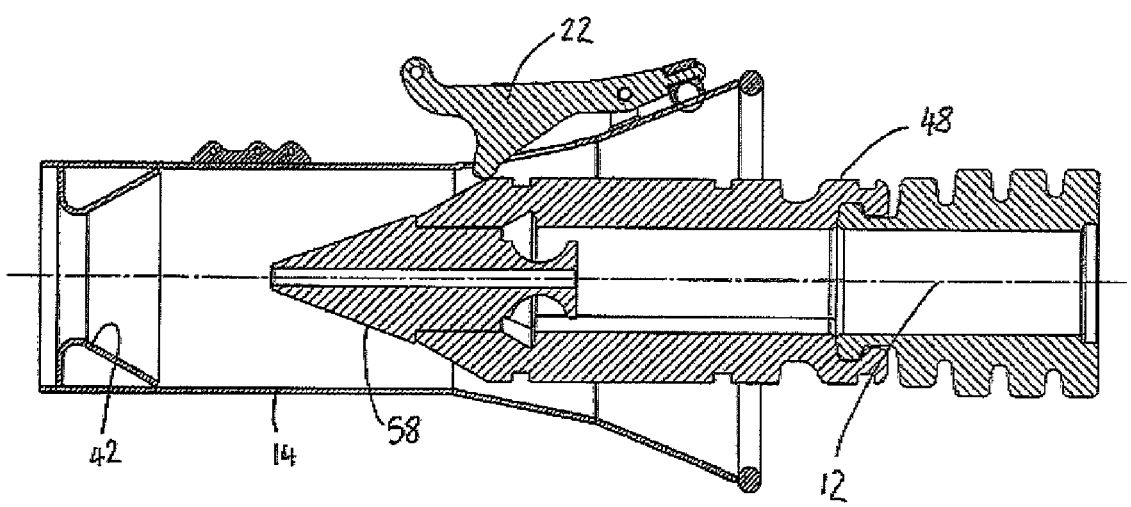
Figure 9:
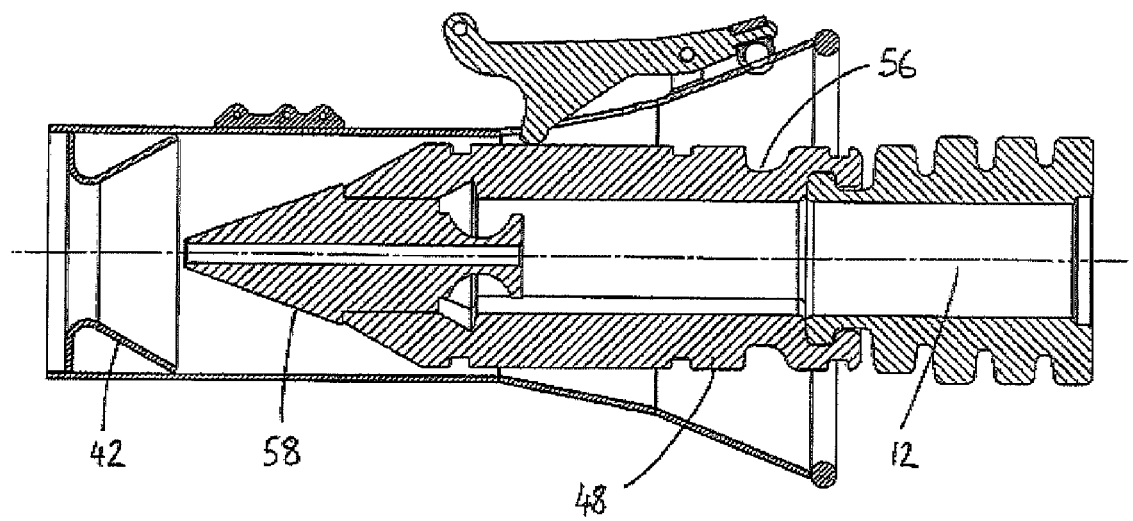
Figure 10:
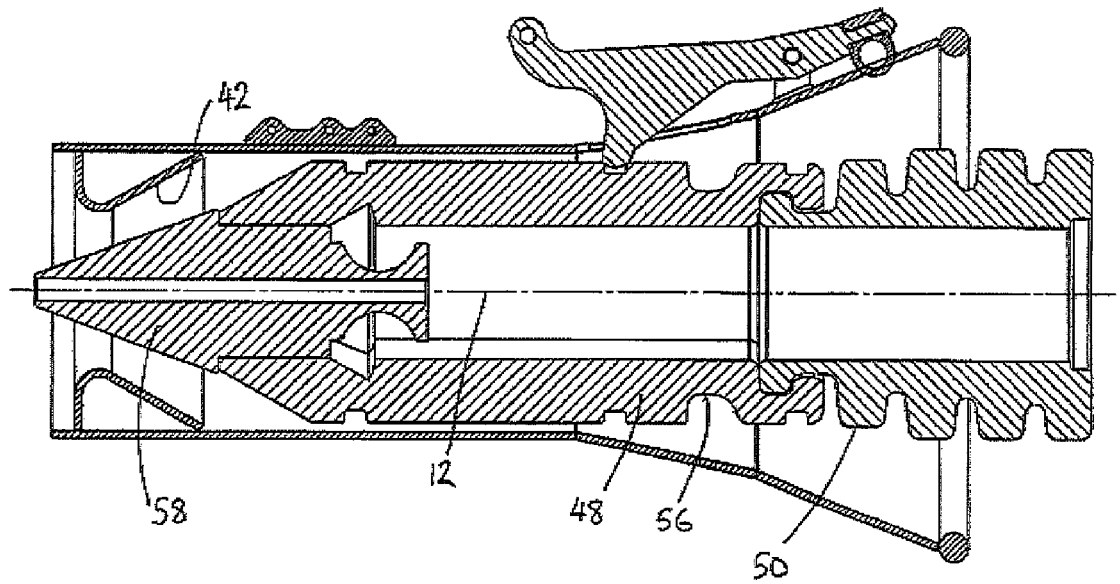
Figure 11:
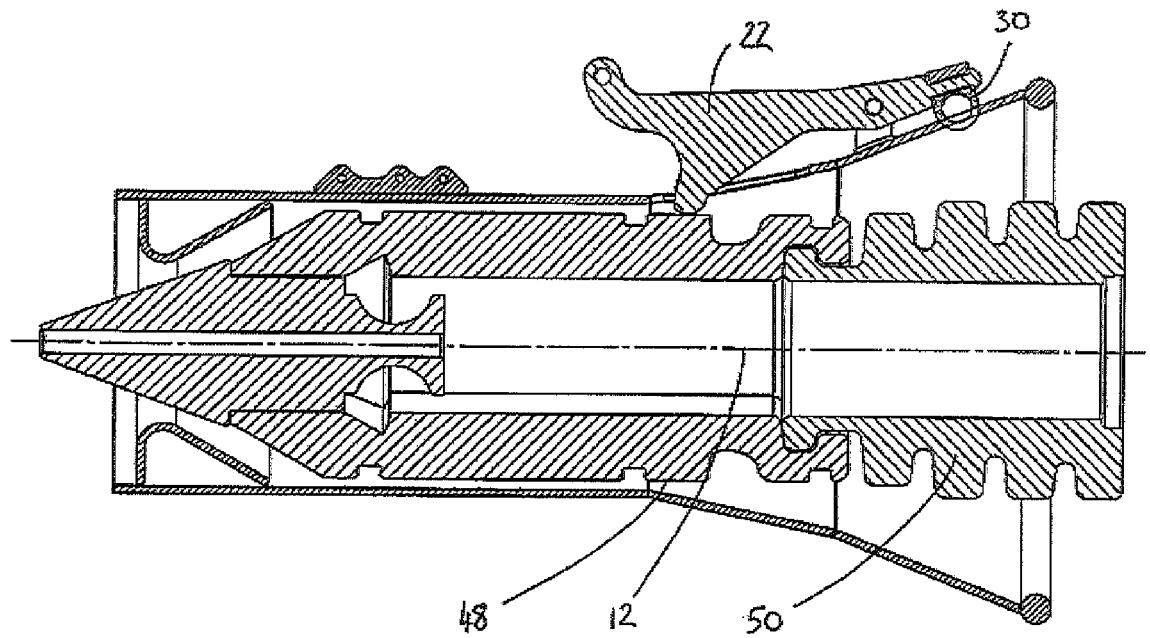

In use the receiving member 14 will be mounted or otherwise located as discussed above, on a J tube or elsewhere. The mounting member 16 sealingly provided on a cable is introduced into the mouth 20 of the receiving member 14 and moved thereinto (FIG. 6).

Figure 12:
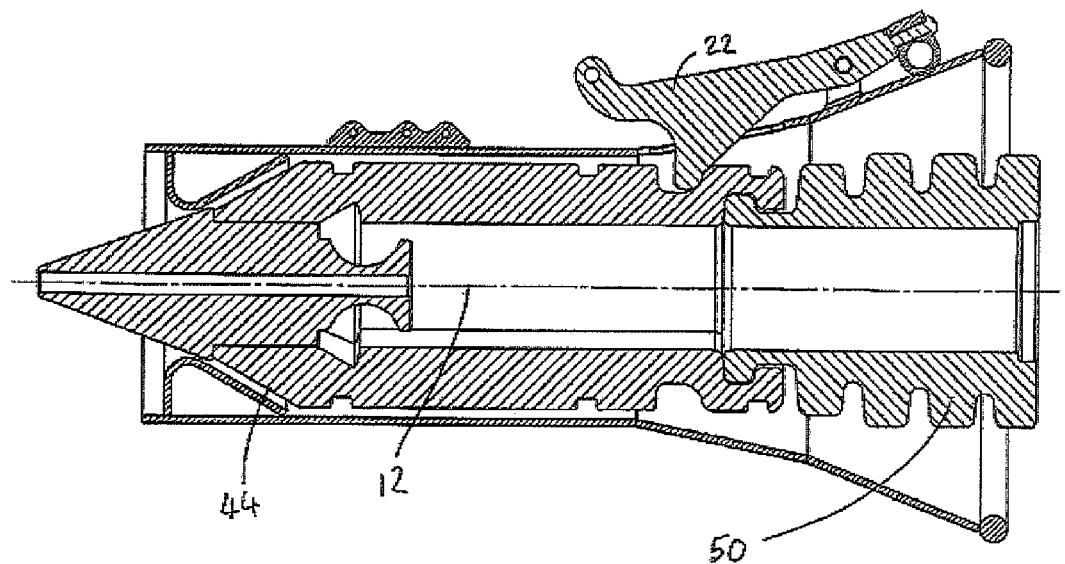

The end 54 of the mounting member 16 will engage against the inclined face 38 of the latch part 34, (FIG. 7) urging the latch part 34 outwardly to enable the mounting member 16 to continue moving into the receiving member 14, until the mounting member end 54 contacts the sealing ring 42 (FIG. 10) to eventually prevent further movement into the receiving member 14 (FIG. 12). With the sealing member 44 on the sealing stop ring 42, providing a seal between the receiving and mounting members 14, 16 a seal at this point.

Around the point that the end 54 of the mounting member 16 reaches the ring 42, the retaining formation groove 56 will become aligned with the latch part 34, which latch part 34 will therefore drop into the groove 56 by virtue of the polymer spring 30 acting between the latch member 22 and receiving member 14. The radial rear face 40 of the latch part 34 will engage against the distal edge of the retaining groove 56, and retain the mounting member 16 in the receiving member 14. As the receiving member 14 enters the mounting member 16 the guide members 46 urge the mounting member 16 into a correct alignment in the receiving member 14.

The cable will now be securely connected to a J tube, and a seal will be provided between the receiving member 14 and mounting member 16 to prevent ingress of moisture into the J tube. A pointed pull in head 58 may be mounted to the distal end of the mounting member 16 and/or the cable to assist insertion of the cable. The pull in head 58 is of a size to be able to pass through the sealing/stop ring 42.

If it is required to disconnect the cable, which is not likely to be a regular occurrence, but may be necessary for instance for maintenance, repair or refurbishment, it is necessary for the latch part 34 to be removed from the groove 56. This can potentially be achieved in a number of ways. If a line means or other control is connected to the hole 32 this can be pulled to urge the latch part 34 outwardly. If this does not work, or no connection is provided to the hole 32, the pivot pin 24 can be removed. This could be achieved by causing the pivot pin 24 to shear, or by removing the fastening means 27. These operations may be carried out remotely, or perhaps by a diver as is appropriate, and potentially using the head 28 with the through hole.

In this instance the receiving member is made from an appropriate metal. The latch member is metallic and may be made from coated stainless steel, carbon steel, titanium or perhaps a combination of these materials. Composite materials may though be a possibility for the latch member. As indicated the mounting member may be made of plastics material such as for instance polyurethane. The distal and proximal parts of the mounting member may be made of different materials, or different grades of material to provide the different degrees of flexibility.

There is thus described a connection apparatus which readily permits automatic connection, and protection for a cable when in position. The connection can be disconnected by a one of a number of methods, if required.

It is to be realized that a wide range of modifications may be made without departing from the scope of the invention. For instance different materials may be used than those indicated above. The latch member may take a different form, and different disconnection arrangements for the latch member could be provided. The mounting member may take a different form. The receiving member could be mounted differently to a J tube, or could be integrally formed therewith. Whilst reference to mounting a cable to a J tube has been made, it is to be realized that apparatus according to the invention could be used in a wide range of different applications.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. Connection apparatus for mounting a cable to a structure, the connection apparatus including;
   a receiving member for location on the structure, the receiving member comprising a cylindrical hollow body with a diverging mouth;
   a latch member pivotally mounted on the outside of the cylindrical hollow body, having a latch part that is selectively extendable into the cylindrical hollow body, wherein a pivot pin is provided on the latch member that is engageable with a pivot formation on the outside of the cylindrical hollow body; and
   a mounting member through which the cable can extend, the mounting member being locatable in the cylindrical hollow body with the latch part selectively engageable with a retaining formation on the mounting member to retain the mounting member in the cylindrical hollow body and hence the cable mounted to the structure, wherein:
   the latch member is selectively movable between an engagement position in which the latch part can engage with the retaining formation of the mounting member, and a disengagement position in which the latch part is clear of the retaining formation of the mounting member, such that the mounting member can be withdrawn from the cylindrical hollow body; and,
   the latch part is on one side of the pivot formation and a resilient member is provided on the other side of the pivot formation, the resilient member being configured to urge the latch part into the retaining formation of the mounting member.

2. The connection apparatus according to claim 1, wherein in which the connection apparatus is arranged such that the latch part automatically engages with the retaining formation of the mounting member as the mounting member is introduced into the body, latch member being urged to an engagement position.

3. The connection apparatus according to claim 1, in which a link formation is provided on the latch member to permit the latch member to be moved to the disengagement position by remote operation.

4. The connection apparatus according to claim 3, in which the link formation is provided on the same side of the pivot formation as the latch part.

5. The connection apparatus according to claim 4, in which a pivot pin is provided on the latch member engageable with a pivot formation on the outside of the hollow member, the link formation being provided on an opposite side of the latch member to the pivot formation.

6. The connection apparatus according to claim 1, in which the latch part has an outwardly facing inclined edge, with which inclined edge the mounting member is engageable when entering the cylindrical hollow body, such that the latch part is urged outwardly until the latch part engages with the retaining formation.

7. The connection apparatus according to claim 1, in which the latch part has an at least generally radially aligned edge facing inwardly to retain the mounting member in the hollow body once the latch part engages with the retaining formation.

8. The connection apparatus according to claim 1, wherein the retaining formation comprises a groove for receiving the latch part.

9. The connection apparatus according to claim 1, wherein the pivot pin is selectively removable from the pivot formation to permit release of the latch member from the cylindrical hollow body.

10. Connection apparatus for mounting a cable to a structure, the connection apparatus including:
    a receiving member for location on the structure, the receiving member comprising a hollow body with a diverging mouth;
    a latch member, movable about a pivot on the outside of the hollow body, the latch member having a latch part that is selectively extendable into the hollow body; and
    a mounting member through which the cable can extend, the mounting member being locatable in the hollow body with the latch part selectively engageable with a retaining formation on the mounting member to retain the mounting member in the hollow body, wherein:
    the latch member is selectively movable between an engagement position in which the latch part can engage with the mounting member, and a disengagement position in which the latch part is clear of the mounting member, such that the mounting member can be withdrawn from the hollow body; and
    the latch part is on one side of the pivot and a resilient member is provided on the other side of the pivot, the resilient member being configured to urge the latch part into the mounting member.

11. Connection apparatus for mounting a cable to a structure, the connection apparatus including:
    a receiving member for location on the structure, the receiving member comprising a hollow body with a diverging mouth;
    a latch member, movable about a pivot on the outside of the hollow body, the latch member having a latch part that is selectively extendable into the hollow body; and
    a mounting member through which the cable can extend, the mounting member being locatable in the hollow body with the latch part selectively engageable with a retaining formation on the mounting member to retain the mounting member in the hollow body, wherein:
    the latch member is selectively movable between an engagement position in which the latch part can engage with the retaining formation of the mounting member, and a disengagement position in which the latch part is clear of the retaining formation of the mounting member, such that the mounting member can be withdrawn from the hollow body, wherein:
    the latch part is on one side of the pivot and a resilient member is provided on the other side of the pivot; and the resilient member is configured to cause the latch part to automatically engage with the retaining formation of the mounting member as the mounting member is introduced into the hollow body, the latch member being urged to the engagement position.

\* \* \* \* \*